United States Patent
Bianco et al.

(10) Patent No.: US 11,784,563 B2
(45) Date of Patent: Oct. 10, 2023

(54) HIGH VOLTAGE STARTUP BOOSTER

(71) Applicant: STMICROELECTRONICS S.R.L., Agrate Brianza (IT)

(72) Inventors: Alberto Bianco, Gressan (IT); Giuseppe Scappatura, Aosta (IT); Francesco Ciappa, Borgofranco d'Ivrea (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 93 days.

(21) Appl. No.: 17/244,795

(22) Filed: Apr. 29, 2021

(65) Prior Publication Data

US 2021/0249953 A1 Aug. 12, 2021

Related U.S. Application Data

(63) Continuation of application No. 16/671,002, filed on Oct. 31, 2019, now Pat. No. 11,018,578.

(51) Int. Cl.
*H02M 3/156* (2006.01)
*H02M 3/07* (2006.01)

(52) U.S. Cl.
CPC ............ *H02M 3/156* (2013.01); *H02M 3/07* (2013.01)

(58) Field of Classification Search
CPC ........... H02M 3/156; H02M 3/07; H02M 1/36
See application file for complete search history.

(56) References Cited

U.S. PATENT DOCUMENTS

| | | | |
|---|---|---|---|
| 5,640,317 A | * | 6/1997 | Lei .......................... H02M 1/36 363/49 |
| 6,534,961 B2 | | 3/2003 | Brandt |
| 9,048,747 B2 | | 6/2015 | Ansari |
| 2004/0245969 A1 | | 12/2004 | McClean |
| 2014/0036556 A1 | | 2/2014 | Murakami et al. |

OTHER PUBLICATIONS iwatt, "Low-Power Off-Line Digital Green-Mode PWM Controller," Product Data Sheet, iW1697, Rev. 1.1, Feb. 1, 2012, 12 pages.
Ribarich, "Using the IRS25751 High-Voltage Start-Up IC," Application Note AN-1209, Version 1.0, 2014, International Rectifier, 11 pages.
Supertex inc., "High Input Voltage SMPS Start-up," Product Data Sheet, LR745, © 2008, 8 pages.

* cited by examiner

*Primary Examiner* — Emily P Pham
(74) *Attorney, Agent, or Firm* — Seed IP Law Group LLP

(57) ABSTRACT

An electronic device includes a circuit board that manages supply of electricity to the electronic device. The circuit board includes an integrated circuit and an external capacitor coupled to a supply terminal of the circuit board. During a startup operation of the integrated circuit, the integrated circuit supplies a first charging current to charge the capacitor to a supply voltage value. The circuit board includes a boost circuit that receives a portion of the first charging current and outputs a second charging current that augments charging of the capacitor. The second charging current is an amplification of the first charging current. The integrated circuit enables operation of the electronic device after the capacitor is charged to the supply voltage value.

16 Claims, 6 Drawing Sheets

500

502

RECEIVE AN INPUT VOLTAGE AT AN INPUT TERMINAL OF A CIRCUIT BOARD

504

OUTPUT, RESPONSIVE TO RECEIVING THE INPUT VOLTAGE, A FIRST CHARGING CURRENT FROM AN INTEGRATED CIRCUIT POSITIONED ON THE CIRCUIT BOARD

506

PASS AT LEAST A PORTION OF THE FIRST CHARGING CURRENT THROUGH A BASE TERMINAL OF A BIPOLAR TRANSISTOR POSITIONED ON THE CIRCUIT BOARD

508

CHARGE A FIRST CAPACITOR TO A SUPPLY VOLTAGE VALUE OF THE INTEGRATED CIRCUIT DIE BY SUPPLYING A SECOND CHARGING CURRENT FROM THE BIPOLAR TRANSISTOR

510

ENABLE, WITH THE INTEGRATED CIRCUIT, SUPPLY OF AN OUTPUT VOLTAGE FROM THE CIRCUIT BOARD RESPONSIVE TO THE FIRST CAPACITOR REACHING THE SUPPLY VOLTAGE VALUE

CHARGE, TO A SUPPLY VOLTAGE VALUE, A FIRST CAPACITOR COUPLED TO A SUPPLY VOLTAGE TERMINAL OF AN INTEGRATED CIRCUIT BY SUPPLYING A FIRST CHARGING CURRENT FROM THE INTEGRATED CIRCUIT AS A STARTUP PROCEDURE OF THE INTEGRATED CIRCUIT

604

AUGMENT THE CHARGING OF THE FIRST CAPACITOR TO THE SUPPLY VOLTAGE LEVEL BY GENERATING, WITH A BOOST CIRCUIT EXTERNAL TO THE INTEGRATED CIRCUIT, A SECOND CHARGING CURRENT BY AMPLIFYING A PORTION OF THE FIRST CHARGING CURRENT

606

ENABLE, WITH THE INTEGRATED CIRCUIT, SUPPLY OF AN OUTPUT VOLTAGE TO AN ELECTRONIC DEVICE RESPONSIVE TO THE FIRST CAPACITOR REACHING THE SUPPLY VOLTAGE LEVEL

Figure 6

HIGH VOLTAGE STARTUP BOOSTER

BACKGROUND

Technical Field

The present disclosure relates to the field of circuits for controlling the supply of power to electronic devices.

Description of the Related Art

Many electronic devices are powered by high voltages. These electronic devices often include circuit boards that manage the supply of power to the electronic device. When a voltage is first received from a voltage source, an integrated circuit enters a startup mode in which the integrated circuit charges one or more external components. The speed of the startup mode is limited by the current that the integrated circuit can supply during startup. The size of the current is limited by how much heat the integrated circuit can safely dissipate.

BRIEF SUMMARY

In one embodiment, a device includes an input terminal that receives an input voltage, an output terminal that supplies an output voltage, and a first capacitor. The device includes an integrated circuit that controls supply of the output voltage to the output terminal. The integrated circuit includes a supply voltage terminal that receives a supply voltage and is coupled to the first capacitor. The integrated circuit includes a high voltage startup circuit that begins charging the first capacitor to the supply voltage value by supplying a first charging current from the supply voltage terminal when the input terminal receives the input voltage. The device includes a boost circuit that augments the charging of the first capacitor by generating a second charging current based on the first charging current.

In one embodiment, a method includes charging, to a supply voltage value, a first capacitor coupled to a supply voltage terminal of an integrated circuit by supplying a first charging current from the integrated circuit as a startup procedure of the integrated circuit. The method includes augmenting the charging of the first capacitor to the supply voltage level by generating, with a boost circuit external to the integrated circuit, a second charging current by amplifying a portion of the first charging current. The method includes enabling, with the integrated circuit, supply of an output voltage to an electronic device responsive to the first capacitor reaching the supply voltage level.

In one embodiment, the method includes receiving an input voltage at an input terminal of a circuit board and outputting, responsive to receiving the input voltage, a first charging current from an integrated circuit positioned on the circuit board. The method includes passing at least a portion of the first charging current through a base terminal of a bipolar transistor positioned on the circuit board. The method includes charging a first capacitor to a supply voltage value of the integrated circuit by supplying a second charging current from the bipolar transistor and enabling, with the integrated circuit, supply of an output voltage from the circuit board responsive to the first capacitor reaching the supply voltage value.

BRIEF DESCRIPTION OF THE SEVERAL VIEWS OF THE DRAWINGS

FIG. 5 is a flow diagram of a process for managing supply of electricity to an electronic device, according to one embodiment.

FIG. 6 is a flow diagram of a process for managing supply of electricity to an electronic device, according to one embodiment.

DETAILED DESCRIPTION

Figure 1:
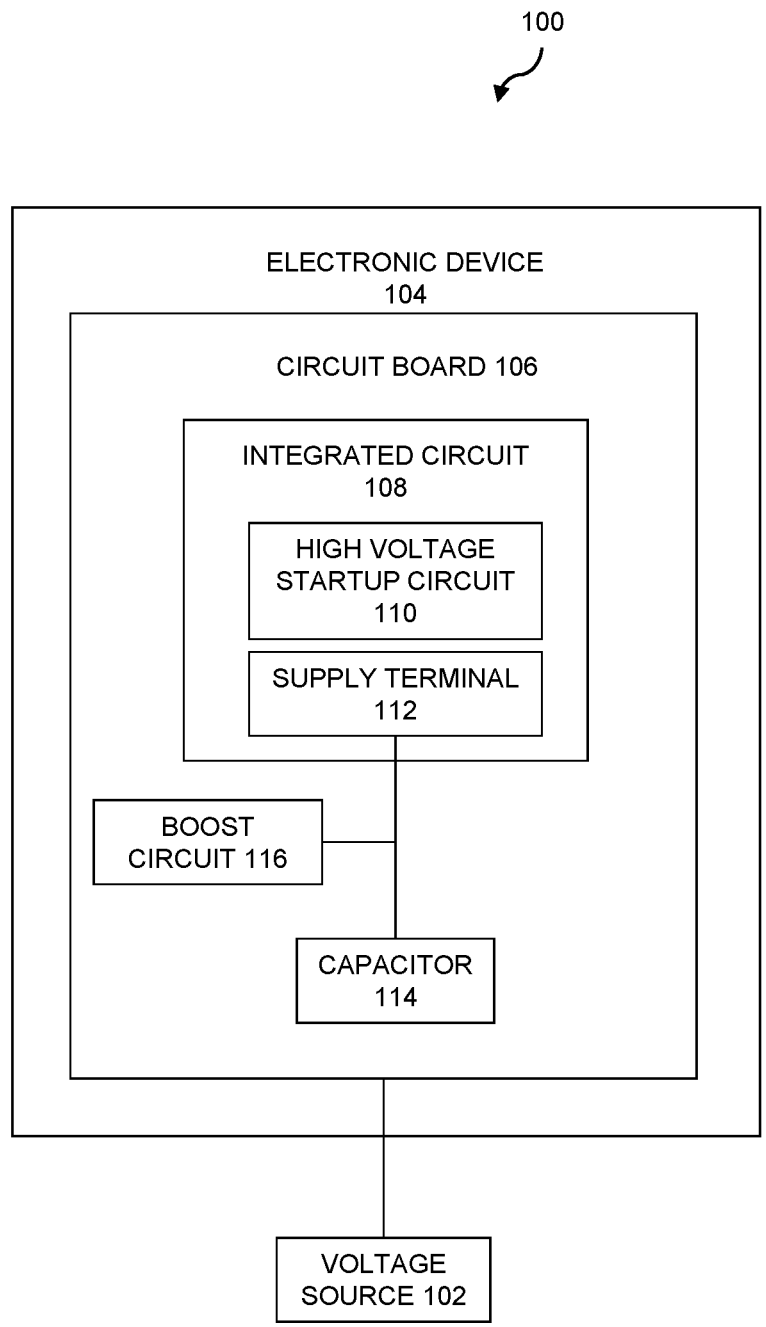
FIG. 1 is a block diagram of an electronic system, according to one embodiment.

FIG. 1 is a block diagram of an electronic system 100, according to one embodiment. The electronic system 100 includes a voltage source 102, and an electronic device 104. The electronic device 104 includes a circuit board 106. The electronic system 100 can include other components without departing from the scope of the present disclosure.

The voltage source 102 provides electricity for powering the electronic device 104. The voltage source 102 can include a municipal power grid that provides electricity to a municipality for powering electronic devices and circuits. The voltage source 102 can include an auxiliary power supply for providing auxiliary power in the event of a fault in a municipal power grid. The voltage source 102 can include batteries, flywheels, super capacitors, combustion powered generators, wind turbines, hydroelectric generators, or other sources of electricity.

In one embodiment, the voltage source 102 supplies an AC voltage. In the example of a municipal power grid, the voltage source 102 may supply AC voltages including 90 V, 115 V, 230 V, 300 V or other voltage values. The AC voltage may have a frequency of 50 Hz or 60 Hz. The AC voltage can have amplitudes and frequencies other than those described above without departing from the scope of the present disclosure.

In one embodiment, the voltage source 102 supplies a DC voltage. The DC voltage can include voltages between 50 V DC 500 V DC. The DC voltage can have values outside this range without departing from the scope of the present disclosure.

The voltage source 102 can include a power outlet from which electricity is provided to power electronic devices and circuits. The power outlet can include common wall outlets in accordance with recognized standards of various municipalities and regions.

In one embodiment, the electronic device 104 is a light fixture. The light fixture can include interior lights of a home or building, exterior lights of the home or building, streetlights, or other types of light fixtures. In one embodiment, the electronic device 104 can include computing devices, home appliances, hospital equipment, or other types of electronic devices that receive power from a voltage source.

The circuit board 106 controls the supply of power from the voltage source 102 to the electronic device 104. For example, the electronic device 104 may be configured to operate on a voltage other than the voltage provided by the voltage source 102. Accordingly, one function of the circuit board 106 may be to convert the input voltage received from the voltage source 102 to an output voltage that can power the electronic device 104.

The circuit board 106 can receive an AC voltage from the voltage source 102 and can convert the AC voltage to a DC voltage. The circuit board 106 can receive an AC voltage from the voltage source 102 and can transform the AC voltage to an AC voltage having a higher or lower amplitude. The circuit board 106 can receive a DC voltage from the voltage source 102 and can output an AC voltage to the electronic device 104. The circuit board 106 can receive a DC voltage and can convert it to a DC voltage having a higher or lower value. Accordingly, the circuit board 106 is able to receive an input voltage from the voltage source 102 and to convert the input voltage to an output voltage of a desired type and amplitude.

The circuit board 106 includes an integrated circuit 108 that controls the supply of power to the electronic device 104. For example, the output voltage can be provided to the electronic device 104 via one or more power transistors. The gates of the power transistors are controlled by the integrated circuit 108. Accordingly, the integrated circuit 108 controls switching of the power transistors, thereby controlling the supply of the output voltage to the electronic device 104.

The integrated circuit 108 includes a supply voltage terminal 112. The supply voltage terminal 112 receives a supply voltage. The supply voltage can be a positive DC supply voltage of the integrated circuit 108.

The integrated circuit 108 does not enable the supply of the output voltage to the electronic device 104 unless the supply voltage is present at the supply voltage terminal 112. Accordingly, if the supply voltage terminal 112 does not receive the supply voltage, then the integrated circuit 108 will not enable operation of the electronic device 104.

The supply voltage terminal 112 of the integrated circuit 108 is coupled to a capacitor 114. The capacitor 114 is external to the integrated circuit 112. In one embodiment, the integrated circuit 108 will not enable the output of the output voltage until the capacitor 114 is charged to the supply voltage value. When the capacitor 114 is charged to the supply voltage value, the supply voltage terminal 112 receives the supply voltage value.

When the voltage source 102 is not connected to the circuit board 106, the integrated circuit 108 is not operational and the capacitor 114 is not charged to the supply voltage value. The result is that when the voltage source is first connected to the circuit board 106, the integrated circuit 108 does not immediately enable supply of the output voltage to the electronic device 104. The integrated circuit 108 will not enable supply of the output voltage to the electronic device 104 until the capacitor 114 is charged to the supply voltage value.

The integrated circuit 108 includes a high-voltage startup circuit 110. The high-voltage startup circuit 110 initiates charging of the capacitor 114 to the supply voltage value when the circuit board 106 is initially connected to the voltage source 102. In particular, when the voltage source 102 is first connected to the circuit board 106, the circuit board 106 receives the input voltage from the voltage source 102. The integrated circuit 108 receives, on one of its terminals, a voltage indicating that the circuit board 106 is connected to the voltage source 102. The high-voltage startup circuit 110 initiates charging of the capacitor 114 responsive to the circuit board 106 receiving the input voltage from the voltage source 102.

In one embodiment, the high-voltage startup circuit 110 initiates charging of the capacitor 114 by outputting a first charging current. When the input voltage is received from the voltage source 102, the high-voltage startup circuit 110 outputs the first charging current. The first charging current begins the charging of the capacitor 114 to the supply voltage value.

The first charging current supplied by the high-voltage startup circuit 110 may not, by itself, be sufficient to charge the capacitor 114 to the supply voltage value in a satisfactorily short time range. In the example in which the electronic device 104 is a light fixture, it may be desirable that the light fixture illuminates within a selected amount of time after providing the input voltage from the voltage source 102 to the circuit board 106. The delay between receipt of the input voltage and the turning on of the light fixture is based, at least in part, on how quickly the capacitor 114 charges to the supply voltage level of the integrated circuit 108. If the high-voltage startup circuit 110 is not able to output a charging current of sufficient magnitude to charge the capacitor 114 within the selected amount of time, then the light fixture will not illuminate within the selected amount of time.

Accordingly, the circuit board 106 includes a boost circuit 116 that reduces the charging time of the capacitor 114. The boost circuit 116 receives or detects the first charging current provided by the high-voltage startup circuit 110 and provides a second charging current. In one embodiment, the second charging current is a current that is an amplification of the first charging current, or an amplification of a portion of the first charging current, provided by the high-voltage startup circuit 110. Accordingly, the boost circuit 116 amplifies the charging current provided by the high-voltage startup 110.

The second charging current helps charge the capacitor 114 to the supply voltage level. Because the second charging current is an amplification of the first charging current, the second charging current helps to charge the capacitor 114 much more quickly than could be accomplished by the first charging current alone. Accordingly, the boost circuit 116 augments the charging of the capacitor 114.

In one embodiment, the boost circuit 114 includes a bipolar transistor. The bipolar transistor includes a base terminal, a collector terminal, and an emitter terminal. The bipolar transistor receives, as a base current, at least a portion of the first charging current. The bipolar transistor outputs a second charging current. The second charging current is an emitter current or collector current of the bipolar transistor. The emitter current of a bipolar transistor is an amplification of the base current by the transistor current gain factor (3. In one embodiment, at least a portion of the second charging current serves to charge the capacitor 114. In one embodiment, the entirety of the second charging current can charge the capacitor 114.

While FIG. 1 shows a single capacitor 114, in practice there may be multiple capacitors coupled to the supply voltage terminal 112 of the integrated circuit 108. For example, a first capacitor may be directly coupled between the supply voltage terminal and ground. A second capacitor may be coupled to the supply voltage terminal via one or more resistors and/or transistors. The first and second capacitors may be coupled together in such a way that charging one of the capacitors to the supply voltage value will require charging the other capacitor to the supply voltage value. Accordingly, the second charging current may assist in charging both capacitors to the supply voltage level. Alternatively, the second charging current may augment charging of a first capacitor by enabling the first charging current to primarily charge the first capacitor while the second charging current charges the second capacitor.

The boost circuit 116 can greatly decrease a charging time of the capacitor 114. The result is that the supply voltage terminal 112 reaches the supply voltage level much more quickly than would be possible in the absence of the boost circuit 116. Accordingly, the integrated circuit 108 enables supply of the output voltage to the electronic device 104 much more quickly than would happen in the absence of the boost circuit 116.

In one embodiment, the circuit board 106 is external to the electronic device 104. Thus, while FIG. 1 shows the circuit board 106 as being part of the electronic device 104, in some embodiment the circuit board 106 may be external to the electronic device 104. Additionally, the circuit board 106 can include multiple circuit boards configured to collectively operate the electronic device 104.

Figure 2:
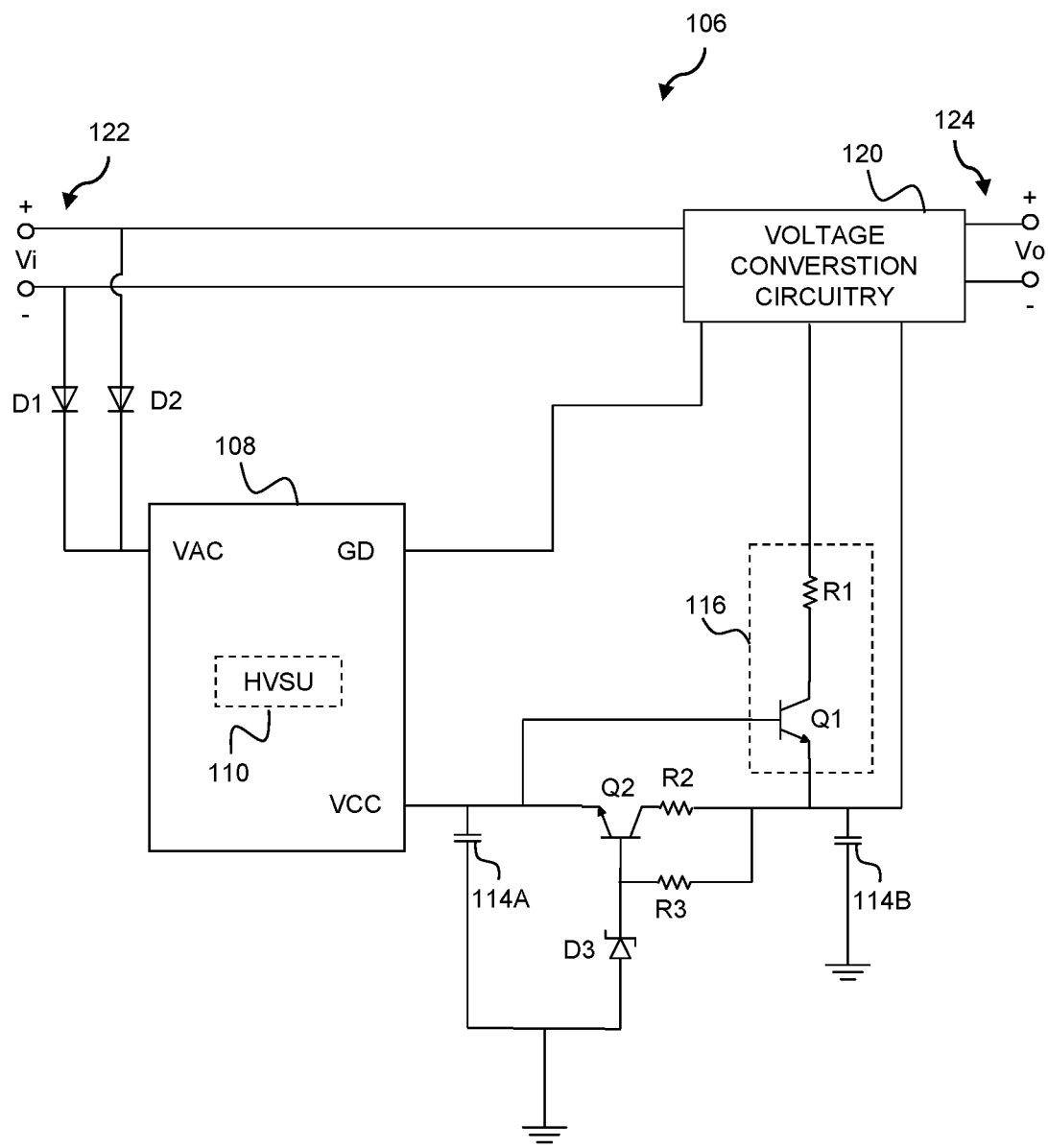
FIG. 2 is a schematic diagram of a circuit board, according to one embodiment.

FIG. 2 is a schematic diagram of a circuit board 106, according to one embodiment. The circuit board 106 includes an input terminal 122, an output terminal 124, voltage conversion circuitry 120, an integrated circuit 108, and boost circuit 116. The components of the circuit board 106 cooperate to manage supply of electricity to an electronic device 104.

The input terminal 122 receives an input voltage $V_i$. The input voltage $V_i$ can be received from a voltage source 102 as described in relation to FIG. 1. The input voltage $V_i$ can include an AC voltage or DC voltage.

The voltage conversion circuitry 120 receives the input voltage $V_i$ from the input terminal 122. The voltage conversion circuitry 120 converts the voltage $V_i$ to an output voltage $V_o$ that is provided to the output terminal 124. The output voltage $V_o$ powers the electronic device 104.

The voltage conversion circuitry 120 can include various circuits and components for converting the input voltage $V_i$ to the output voltage $V_o$. The voltage conversion circuitry 120 can include rectifiers, transformers, inverters, voltage regulators, integrated circuits, transistors, resisters, inductors, diodes, and capacitors.

The voltage conversion circuitry 120 can include one or more power transistors for supplying the output voltage $V_o$ to the output terminal 124. In one embodiment, the voltage conversion circuitry 120 includes a bridge leg including a high side power transistor and a low side power transistor. The voltage conversion circuitry 120 can include other configurations of power transistors or other circuitry for controlling supply of the output voltage $V_o$ without departing from the scope of the present disclosure.

The integrated circuit 108 includes a supply voltage terminal VCC, an input voltage terminal VAC, and a gate drive terminal GD. The supply voltage terminal VCC is one example of the supply voltage terminal 112 of FIG. 1. The integrated circuit 108 also includes a high-voltage startup circuit 110. The integrated circuit 108 controls the supply of power to the electronic device 104.

The input voltage terminal VAC of the integrated circuit 108 is coupled to the input terminal 122 of the circuit board 106 via a first diode D1 and a second diode D2. When the input terminal 122 receives an AC voltage from the voltage source 102, the diodes D1 and D2 rectify the voltage. The terminal VAC of the integrated circuit 108 receives the rectified voltage from the diodes D1 and D2. Accordingly, the integrated circuit 108 detects the presence of the input voltage $V_i$ by receiving the rectified voltage at the terminal VAC, in one embodiment.

After startup of the integrated circuit 108, the integrated circuit 108 is powered by the supply voltage received at the supply voltage terminal VCC. The value of the supply voltage is between 3 V and 20 V DC. The supply voltage can have other values without departing from the scope of the present disclosure.

When the circuit board 106 newly receives the input voltage $V_i$ at the input terminal 122, the integrated circuit 108 receives the rectified voltage at VAC. The integrated circuit 108 wakes up responsive to receiving the rectified voltage at the terminal VAC. The integrated circuit 108 is powered by the rectified voltage received at the terminal VAC until the supply voltage is present at the supply voltage terminal VCC. The integrated circuit 108 not will enable power to be provided to the electronic device 104 until the supply voltage is present at the supply voltage terminal VCC.

Accordingly, upon initially receiving the rectified voltage at the terminal VAC, the integrated circuit 108 enters a startup mode and begins charging the capacitor 114A to the supply voltage. In particular, the high-voltage startup circuit 110 provides a first charging current to the supply voltage terminal VCC. The first charging current helps to charge the capacitor 114A to the supply voltage value. A capacitor 114B is coupled to the capacitor 114A. The function of the capacitor 114B is described in more detail below with relation to FIG. 3.

The boost circuit 116 augments the charging of the capacitor 114A to the supply voltage during the startup mode. In particular, the boost circuit 116 supplies a second charging current based on the first charging current. The second charging current augments the charging of the capacitor 114A. The second charging current can be an amplification of the first charging current. The boost circuit 116 includes the transistor Q1 and the resistor R1. The circuit board also includes resistors R2 and R3, breakdown diode D3, and transistor Q2. The function of the boost circuit 116 is described in more detail below with relation to FIG. 3.

In one embodiment, the integrated circuit 108 includes a gate drive terminal GD. The terminal GD drives one or more power transistors included in the voltage conversion circuitry 120. The output voltage $V_o$ is provided at the output terminal 124 by driving the one or more power transistors. Accordingly, the integrated circuit 108 controls supply of the output voltage $V_o$ to the electronic device 104 by driving the gates of the one or more power transistors.

The integrated circuit 108 begins driving the one or more power transistors after the startup operation is complete. The supply voltage powers the driving of the power transistors via the terminal GD. Accordingly, power will not be supplied to the electronic device 104 until the startup operation is complete and the supply voltage is present at the terminal 112.

Although FIG. 2 illustrates a single gate drive terminal GD, in some embodiments the integrated circuit 108 can include multiple gate drive terminals for driving multiple power transistors. In one example the voltage control circuitry 120 includes a power factor controller. The integrated circuit 108 can include one or more gate drive terminals for driving one or more power transistors of the power factor controller. In one example, the voltage control circuitry 120 includes a half bridge including an upper MOSFET and a lower MOSFET. The integrated circuit 102 can include respective drive terminals for driving the upper MOSFET and the lower MOSFET. In one example, the voltage control circuitry 120 includes both a power factor controller and a half bridge. The integrated circuit 108 can include terminals for driving power transistors of both the power factor controller and the half bridge.

FIG. 2 illustrates the integrated circuit 108 as having terminals VAC, GD, and VCC. However, in practice, the integrated circuit 108 can have additional terminals including ground supply terminals, bootstrap terminals, terminals that monitor or control various aspects of the voltage conversion circuitry 120, and other terminals that can be utilized by an integrated circuit in conjunction with a circuit board for providing power to an electronic device. Those of skill in the art will recognize, in light of the present disclosure, that many other various configurations of an integrated circuit and voltage conversion circuitry can be utilized without departing from the scope of the present disclosure.

Figure 3:
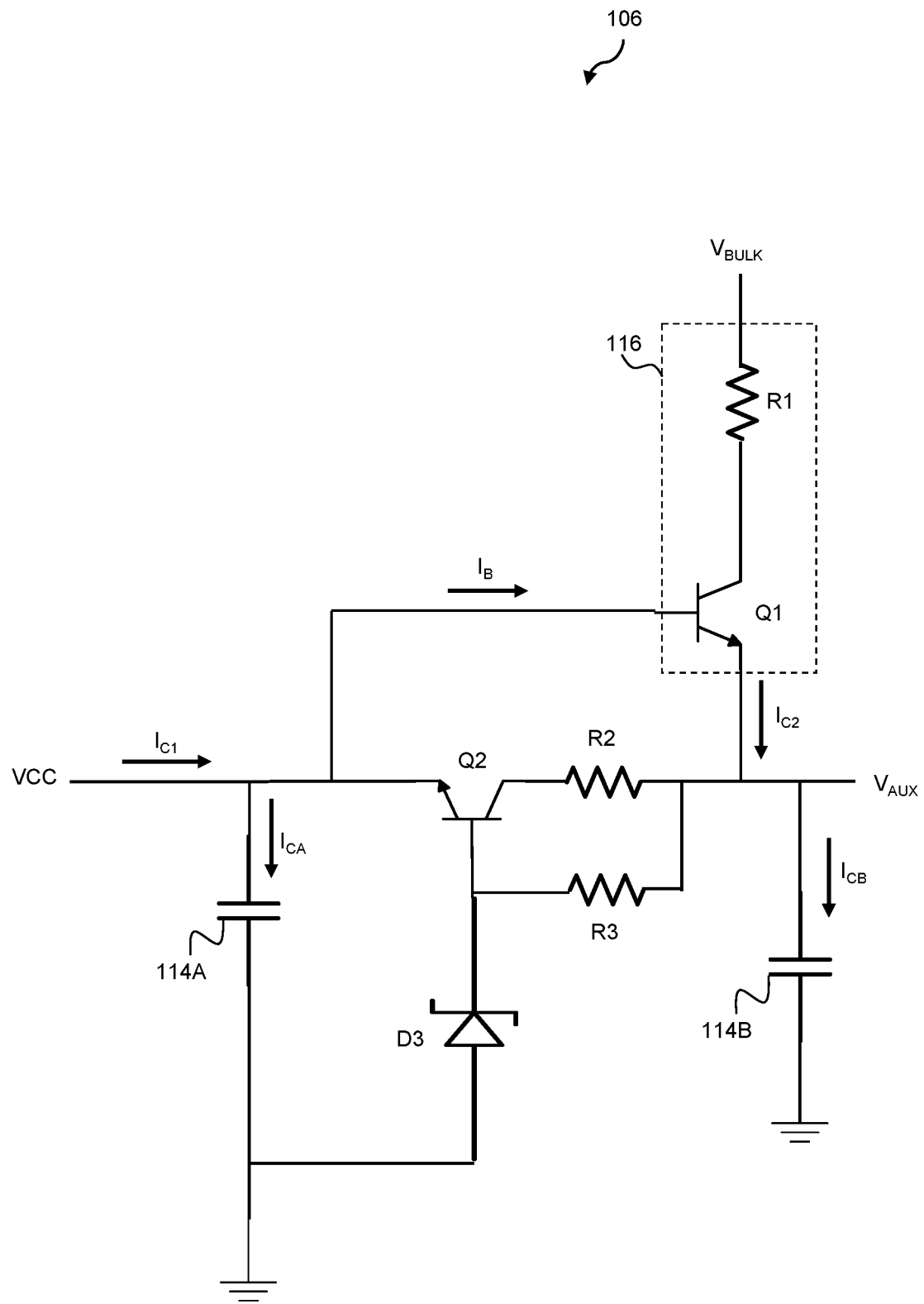
FIG. 3 is a schematic diagram of a circuit board during a startup operation, according to one embodiment.

FIG. 3 is a schematic diagram of a portion of the circuit board 106 of FIG. 2, according to one embodiment. FIG. 3 illustrates various charging currents that charge the capacitors 114A, 114B to the supply voltage level. The charging currents are present during a startup operation of the integrated circuit 108.

The circuit board 106 includes a capacitor 114A and a capacitor 114B. The capacitor 114A is coupled between the terminal 112 of the integrated circuit 108 and ground. The capacitor 114B is coupled between a collector terminal of the transistor Q1 and ground.

In one embodiment, the capacitor 114B has a capacitance that is larger than the capacitance of the capacitor 114A. The comparatively large capacitance of the capacitor 114B allows the capacitor 114B to maintain a voltage close to the desired supply voltage value when charge is drawn from the capacitor 114A. The presence of the transistor Q2 and the resistors R2 and R3 ensures that the voltage on the capacitor 114A is tied to the voltage of the capacitor 114B. The Zener diode D3 sets the voltage on the base of the transistor Q2, and thus helps set the voltage on the emitter of Q2. In particular, if current flows from the capacitor 114A the transistor Q2 becomes forward biased and a current will flow from the capacitor 114B to the capacitor 114A via the transistor Q2. Accordingly, charging or discharging of one of the capacitors will result in the charging or discharging of the other capacitor.

In one example, the capacitance of the capacitor 114A is 10 μF and the capacitance of the capacitor 114B is 180 μF. Accordingly, the capacitor 114B has a capacitance that is significantly larger than the capacitance of the capacitor 114A. The capacitors 114A and 114B can have other values without departing from the scope of the present disclosure.

During the startup operation, the high-voltage startup circuit 110 of the integrated circuit 108 provides a first charging current $I_{C1}$. The first charging current $I_{C1}$ is provided to charge the capacitor 114A to the supply voltage level. The first charging current $I_{C1}$ may have a value between 0.5 mA and 0.2 mA.

Because the capacitor 114B has a significantly higher capacitance than the capacitor 114A, the charging rate of the capacitor 114A is limited by the charging rate of the capacitor 114B. The relatively small first charging current $I_{C1}$ is not able, by itself, to rapidly charge both the capacitors 114A, 114B.

The boost circuit 116 augments the charging of the capacitors 114A, 114B. When the first charging current $I_{C1}$ begins to flow, a portion of the first charging current $I_{C1}$ becomes a base current $I_B$. The base current $I_B$ flows into a base terminal of the bipolar transistor Q1. The transistor Q1 passes a second charging current $I_{C2}$ based on the base current $I_B$. The second charging current $I_{C2}$ augments or hastens the charging of the capacitors 114A, 114B.

The emitter current in a bipolar transistor is related to the base current by a current gain factor β. In particular, the emitter current is given by the relationship:

$$I_E = I_B * (1+\beta),$$

Where $I_E$ is the emitter current and $I_B$ is the base current. The second charging current $I_{C2}$ is the emitter current of the transistor Q1. Thus, the second charging current $I_{C2}$ is equal to the base current $I_B$ multiplied by the current gain factor (β. Accordingly, the second charging current $I_{C2}$ is an amplification of the base current $I_B$ by the gain factor β. Because the base current $I_B$ is based on the first charging current $I_{C1}$, the second charging current $I_{C2}$ is an amplification of the first charging current $I_{C1}$. The value of β is typically between 15 and 200, though other values of β can be used without departing from the scope of the present disclosure. While FIGS. 2 and 3 illustrate a boost circuit 116 including the NPN bipolar transistor Q1, other designs of a boost circuit 116 can be used without departing from the scope of the present disclosure. For example, a boost circuit 116 could utilize a PNP bipolar transistor, or various configurations of multiple transistors and other circuit components, as will be apparent to those of skill in the art in light of the present disclosure.

A portion of the second charging current $I_{C2}$ charges the capacitor 114B. In particular, the current $I_{CB}$ directly charges the capacitor 114B. The current $I_{CA}$ directly charges the capacitor 114A.

The current $I_{CB}$ is related to the current $I_{CA}$ by the following relationship:

$$I_{CB} = I_{CA} * (C_B/C_A),$$

where $C_A$ is the capacitance the capacitor 114A and $C_B$ is the capacitance of the capacitor 114B.

One effect of the boost circuit is that nearly all of the first charging current $I_{C1}$ charges the capacitor 114A because $I_B$ is relatively small compared to $I_{C1}$. The second charging current $I_{C2}$ charges the capacitor 114B. The comparatively large second charging current $I_{C2}$ charges the comparatively large capacitor 114B. In the absence of the boost circuit 116 and the second charging current $I_{C2}$, the first charging current $I_{C1}$ would have to charge both the capacitors 114A, 114B, possibly resulting in an unacceptably slow delay between receiving the input voltage $V_i$ and providing the output voltage $V_o$. Instead, the boost circuit 116 results in the rapid charging of both capacitors 114A, 114B.

In one embodiment, the resistor R1 is coupled between the emitter terminal of the transistor Q1 and a voltage $V_{BULK}$ provided by the voltage conversion circuitry 120. The presence of R1 can enable the dissipation of a large amount of heat without adding an expensive high-power transistor. The value of R1 can be chosen so that almost all the voltage drop occurs across the resistor R1. The value of R1 can be chosen by the relationship $$R1 > (V_{BULK}/I_{C1}) * (CA/CB).$$

In one example, the resistor R1 has a value of 22 kΩ and $V_{BULK}$ has a value between 400 V and 500 V. In one example, the resistor R2 has a value of about 1Ω. In one example, the resistor R3 has a value of about 1 kΩ. Other values of the resistors R1-R3 can be used without departing from the scope of the present disclosure.

In one embodiment, a first terminal of the capacitor 114B is coupled to an auxiliary voltage $V_{AUX}$. The auxiliary voltage $V_{AUX}$ is provided by the voltage conversion circuitry 120. During the startup operation, $V_{AUX}$ is not provided to the capacitor 114B. The auxiliary voltage can be provided by an auxiliary winding of the voltage conversion circuitry 120. During the startup operation, the auxiliary voltage $V_{AUX}$ is not provided to the capacitor 114B. After the startup operation the auxiliary voltage $V_{AUX}$ is provided to the capacitor 114B. After the startup operation, the value of the auxiliary voltage is the supply voltage value. Accordingly, after the startup operation, the supply voltage is provided by the auxiliary winding of the voltage conversion circuitry 120.

Figure 4:
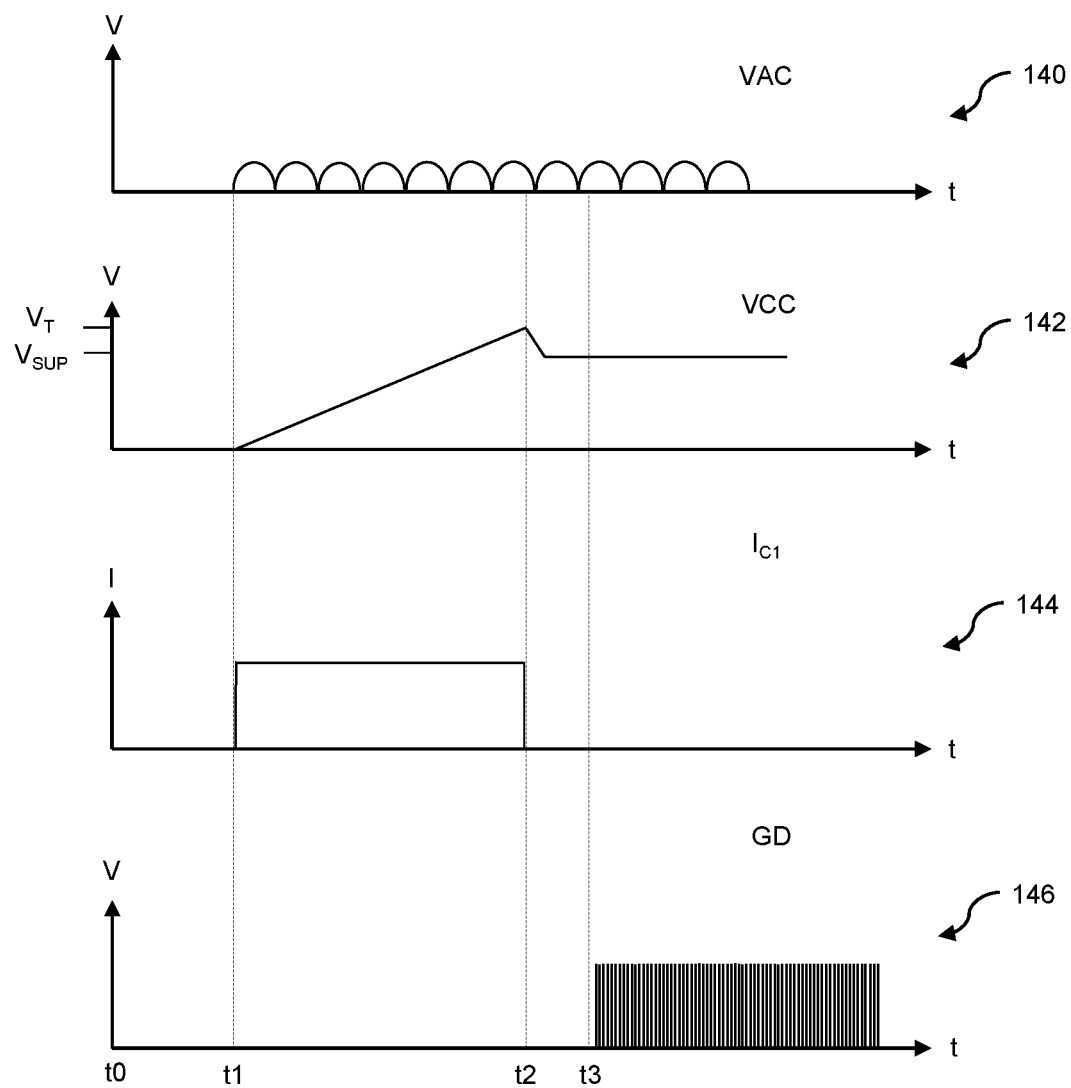
FIG. 4 illustrates a plurality of graphs of electronic signals, according to one embodiment.

FIG. 4 illustrates a plurality of graphs representing various voltages and currents related to a startup operation of an integrated circuit, according to one embodiment. In particular, FIG. 4 illustrates a graph 140 of a voltage at the VAC terminal of the integrated circuit 108, a graph 142 of a voltage at the supply voltage terminal VCC of the integrated circuit 108, a graph 144 of a current supplied by the high-voltage startup unit 110 of the integrated circuit 108, and a graph 146 of a voltage at the terminal GD of the integrated circuit 108. The voltages in the graph 140, 142, 146 may not be of the same scale. For example, the amplitude of the rectified voltage at VAC may be between 50 V and 500 V while the value of the supply voltage may be between 3 V and 20 V. Additionally, the frequency of the rectified voltage may be different than shown in FIG. 4.

At time t0, the input voltage $V_i$ is not received from the voltage source 102. At time t1, the input voltage $V_i$ is received from the voltage source 102 at the input terminal 122. The input voltage $V_i$ is rectified and provided to the terminal VAC of the integrated circuit 108. The graph 140 illustrates the waveform of the rectified voltage received at the terminal VAC at time t1. The integrated circuit 108 enters a startup mode responsive to receiving the rectified voltage at the terminal VAC. The rectified voltage powers the integrated circuit 108 until the startup operation is complete.

With reference to the graph 142, the voltage at the supply terminal VCC is 0 V between t0 and t1 because the input voltage $V_i$ has not yet been received from the voltage source 102. At t1 the input voltage is received and the startup operation begins. The high-voltage startup circuit 110 begins charging the capacitor 114A by outputting the first charging current $I_{C1}$. As the capacitor 114A charges, the voltage at the supply terminal VCC begins to rise. The voltage at the supply terminal VCC rises until the voltage reaches a threshold voltage $V_T$ at time t2. When the voltage at the terminal VCC reaches the threshold voltage $V_T$, the high-voltage startup circuit 110 ceases outputting the first charging current $I_{C1}$. The cessation of the first charging current $I_{C1}$ causes the cessation of the second charging current $I_{C2}$ because there is no longer a base current $I_B$ flowing into the base of the transistor Q1.

In one example, the startup operation lasts for about 250 ms when the input voltage $V_i$ has a value of 115 V AC. In the absence of the boost circuit 116, the startup operation for this input voltage $V_i$ is about 500 ms. At higher input voltages, the benefit of the boost circuit is even greater. For example, when the input voltage $V_i$ is about 300 V AC, the startup operation with the boost circuit 116 is about 150 ms. At 300 V AC, the startup operation without the boost circuit 116 is about 550 ms. Accordingly, the boost circuit 116 greatly reduces the duration of the startup operation.

After the high-voltage startup circuit 110 has ceased outputting the first charging current $I_{C1}$, the voltage of the supply terminal VCC drops from the threshold voltage $V_T$ to the supply voltage value $V_{SUP}$. In one embodiment, the threshold voltage $V_T$ is about 17 V. The supply voltage value $V_{SUP}$ is about 15 V. Other values can be used for the threshold voltage and the supply voltage $V_{SUP}$ without departing from the scope of the present disclosure. In one embodiment, the startup operation is complete when the supply voltage terminal VCC reaches the supply voltage level rather than the threshold voltage $V_T$.

With reference to the graph 144, the first charging current $I_{C1}$ is not supplied between times t0 and t1. At t1, the high-voltage startup circuit 110 enters the startup operation and begins supplying the first charging current $I_{C1}$. The first charging current $I_{C1}$ is supplied until the end of the startup operation at time t2, as is explained in more detail below. Though not illustrated in FIG. 4, the second charging current $I_{C2}$ has a similar waveform as the first charging current $I_{C2}$. The second charging current $I_{C2}$ has a greater magnitude than the first charging current $I_{C1}$. The second charging current $I_{C2}$ activates when the first charging current activates. The second charging current $I_{C2}$ ceases when the first charging current $I_{C1}$ ceases. In one example, the first charging current $I_{C1}$ has a magnitude of about 1 mA. The second charging current $I_{C2}$ has a magnitude of about 20 mA. Other values of the first and second charging current $I_{C1}$ and $I_{C2}$ are possible without departing from the scope of the present disclosure.

With reference to the graph 146, after the startup operation is complete at t2, there is a drive initialization period between t2 and t3. After the drive initialization period is complete at t3, the integrated circuit 108 begins driving the gates of one or more power transistors, thereby enabling the supply of the output voltage $V_o$ the electronic device 104. The integrated circuit 108 switches the power transistor on and off by modulating the voltage at the terminal GD. Thus, at T3, the electronic device receives the output voltage $V_o$ begins to function. The integrated circuit 108 enables the supply of $V_o$ to the electronic device 102 responsive to the supply voltage terminal VCC reaching the supply voltage value $V_{SUP}$.

FIG. 5 is a flow diagram of a process 500, according to one embodiment. At 502 the process 500 includes receiving an input voltage at an input terminal of a circuit board. At 504 the process 500 includes outputting, responsive to receiving the input voltage, a first charging current from an integrated circuit positioned on the circuit board. At 506 the process 500 includes passing at least a portion of the first charging current through a base terminal of a bipolar transistor positioned on the circuit board. At 508 the process 500 includes charging a first capacitor to a supply voltage value of the integrated circuit by supplying a second charging current from the bipolar transistor. At 510 the process 500 includes enabling, with the integrated circuit, supply of an output voltage from the circuit board responsive to the first capacitor reaching the supply voltage value.

FIG. 6 is a flow diagram of a process 600, according to one embodiment. At 602, the process 600 includes charging, to a supply voltage value, a first capacitor coupled to a supply voltage terminal of an integrated circuit by supplying a first charging current from the integrated circuit as a startup procedure of the integrated circuit. At 604, the process 600 includes augmenting the charging of the first capacitor to the supply voltage level by generating, with a boost circuit external to the integrated circuit, a second charging current by amplifying a portion of the first charging current. At 606, the process 600 includes enabling, with the integrated circuit, supply of an output voltage to an electronic device responsive to the first capacitor reaching the supply voltage level.

The various embodiments described above can be combined to provide further embodiments. All U.S. patent application publications and U.S. patent applications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a first capacitor;
   an integrated circuit including:
      a supply voltage terminal that receives a supply voltage and is coupled to the first capacitor; and
      a high voltage startup circuit that begins charging the first capacitor to a supply voltage value by supplying a first charging current from the supply voltage terminal when an input terminal receives the input voltage;
   a boost circuit external to the integrated circuit and that augments the charging of the first capacitor responsive to the first charging current; and
   a circuit board, wherein the first capacitor, the integrated circuit, and the boost circuit are coupled to the circuit board, the circuit board including:
      an input terminal that receives an input voltage, and
      an output terminal that supplies an output voltage, wherein the integrated circuit controls supply of the output voltage from the output terminal.

2. The device of claim 1, wherein the integrated circuit is configured to enable the supply of an output voltage responsive to the supply voltage terminal reaching the supply voltage value.

3. A device, comprising:
   a first capacitor; and
   an integrated circuit including:
      a supply voltage terminal that receives a supply voltage and is coupled to the first capacitor; and
      a high voltage startup circuit that begins charging the first capacitor to a supply voltage value by supplying a first charging current from the supply voltage terminal when an input terminal receives the input voltage; and
      a boost circuit external to the integrated circuit that augments the charging of the first capacitor responsive to the first charging current, wherein the boost circuit generates a second charging to augment the charging of the first capacitor.

4. The device of claim 3, wherein the boost circuit includes a bipolar transistor having a base terminal that receives a portion of the first charging current.

5. The device of claim 4, wherein the bipolar transistor supplies the second charging current as a collector current or an emitter current of the bipolar transistor.

6. The device of claim 5, further comprising a second capacitor coupled to the bipolar transistor.

7. The device of claim 6, wherein the second capacitor has a capacitance at least 10 times greater than a capacitance of the first capacitor.

8. The device of claim 7, wherein the first and second capacitors are coupled together such that if there is a difference in voltage between the first and second capacitors, a current will flow between the first and second capacitors.

9. The device of claim 7, wherein the first charging current is supplied to the first capacitor via the supply voltage terminal.

10. A method, comprising:
    charging, to a supply voltage value, a first capacitor coupled to a supply voltage terminal of an integrated circuit by supplying a first charging current from the integrated circuit; and
    augmenting the charging of the first capacitor to the supply voltage value with a boost circuit external to the integrated circuit responsive to the first charging current, wherein augmenting the charging of the first capacitor includes supplying a second charging current with the boost circuit.

11. The method of claim 10, wherein the second charging current is greater than the first charging current.

12. The method of claim 10, further comprising enabling, with the integrated circuit, supply of an output voltage to an electronic device responsive to the first capacitor reaching a supply voltage level.

13. The method of claim 12, further comprising:
    receiving an input voltage at a first terminal of a circuit board; and
    initiating the startup procedure responsive to receiving the input voltage at the first terminal.

14. The method of claim 13, further comprising generating the output voltage from the input voltage.

15. A method, comprising:
    receiving an input voltage at an input terminal of a circuit board;
    outputting, responsive to receiving the input voltage, a first charging current from an integrated circuit positioned on the circuit board;
    charging a first capacitor to a supply voltage value of the integrated circuit by supplying a second charging current from a boost circuit external to the integrated circuit responsive to the first charging current;
    enabling, with the integrated circuit, supply of an output voltage from the circuit board responsive to the first capacitor reaching the supply voltage value; and
    charging the first capacitor to the supply voltage value by charging a second capacitor to the supply voltage value.

16. The method of claim 15, further comprising:
    passing at least a portion of the first charging current through a base terminal of a bipolar transistor of the boost circuit; and
    supplying the second charging current from the bipolar transistor.

* * * * *

UNITED STATES PATENT AND TRADEMARK OFFICE
CERTIFICATE OF CORRECTION

| | |
|---|---|
| PATENT NO. | : 11,784,563 B2 |
| APPLICATION NO. | : 17/244795 |
| DATED | : October 10, 2023 |
| INVENTOR(S) | : Alberto Bianco et al. |

It is certified that error appears in the above-identified patent and that said Letters Patent is hereby corrected as shown below:

In the Claims

Column 11, Claim 1, Line 26:
"input voltage, and" should read: --input voltage; and--.

Signed and Sealed this
Second Day of January, 2024

Katherine Kelly Vidal
Director of the United States Patent and Trademark Office